No. 694,842. Patented Mar. 4, 1902.
A. DE DION & G. BOUTON.
VARIABLE SPEED AND GEAR REVERSING MECHANISM FOR MOTOR ROAD VEHICLES.
(Application filed Nov. 11, 1901.)

(No Model.) 3 Sheets—Sheet 1.

Witnesses:

Inventors
Albert de Dion
Georges Bouton
By James L. Norris
Atty

No. 694,842. Patented Mar. 4, 1902.
A. DE DION & G. BOUTON.
VARIABLE SPEED AND GEAR REVERSING MECHANISM FOR MOTOR ROAD VEHICLES.
(Application filed Nov. 11, 1901.)
(No Model.) 3 Sheets—Sheet 2.

Witnesses: Inventors
Albert de Dion
Georges Bouton
By James L. Norris.
Atty

No. 694,842. Patented Mar. 4, 1902.
A. DE DION & G. BOUTON.
VARIABLE SPEED AND GEAR REVERSING MECHANISM FOR MOTOR ROAD VEHICLES.
(Application filed Nov. 11, 1901.)
3 Sheets—Sheet 3.
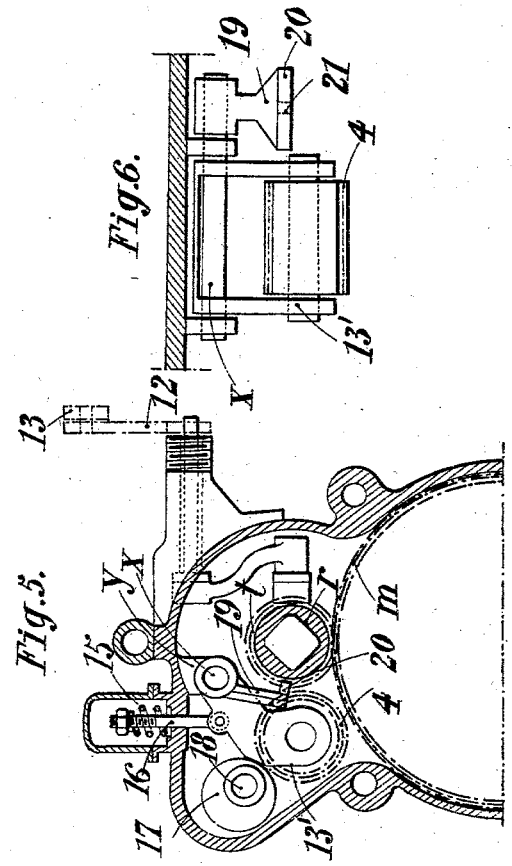

UNITED STATES PATENT OFFICE.

ALBERT DE DION AND GEORGES BOUTON, OF PUTEAUX, FRANCE.

VARIABLE-SPEED AND GEAR-REVERSING MECHANISM FOR MOTOR ROAD-VEHICLES.

SPECIFICATION forming part of Letters Patent No. 694,842, dated March 4, 1902.

Application filed November 11, 1901. Serial No. 81,897. (No model.)

*To all whom it may concern:*

Be it known that we, ALBERT DE DION and GEORGES BOUTON, engineer, citizens of the French Republic, residing at 24 Quai National, Puteaux, Seine, France, have invented certain new and useful Improvements in Variable-Speed and Gear-Reversing Mechanisms for Motor Road-Vehicles, of which the following is a specification.

This invention has for its object an improved mechanism for varying the speed and reversing the gear of motor road-vehicles, the said mechanism being formed by the combination of the friction-clutch referred to in Letters Patent granted to us, No. 645,312, dated March 13, 1900, with a suitable arrangement of gear-wheels which enables us to impart to the vehicle two or more different speeds and also to reverse the direction of its movement, and in order that our invention may be fully understood we shall describe the same with reference to the accompanying drawings, of which—

Figure 1:
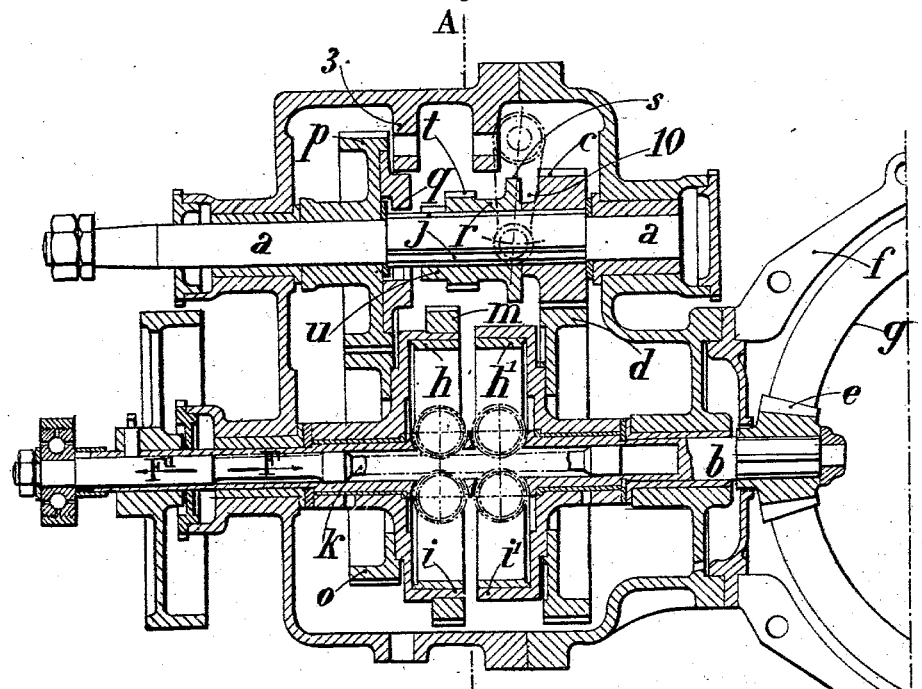
Figure 2:
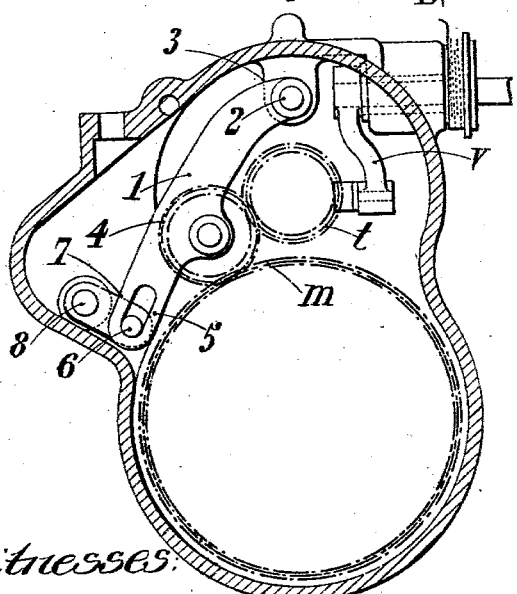
Figure 3:
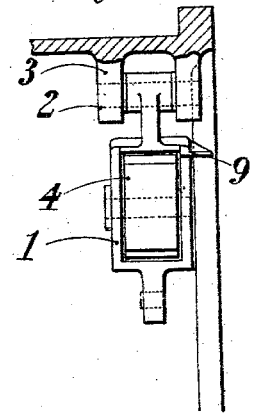
Figure 4:
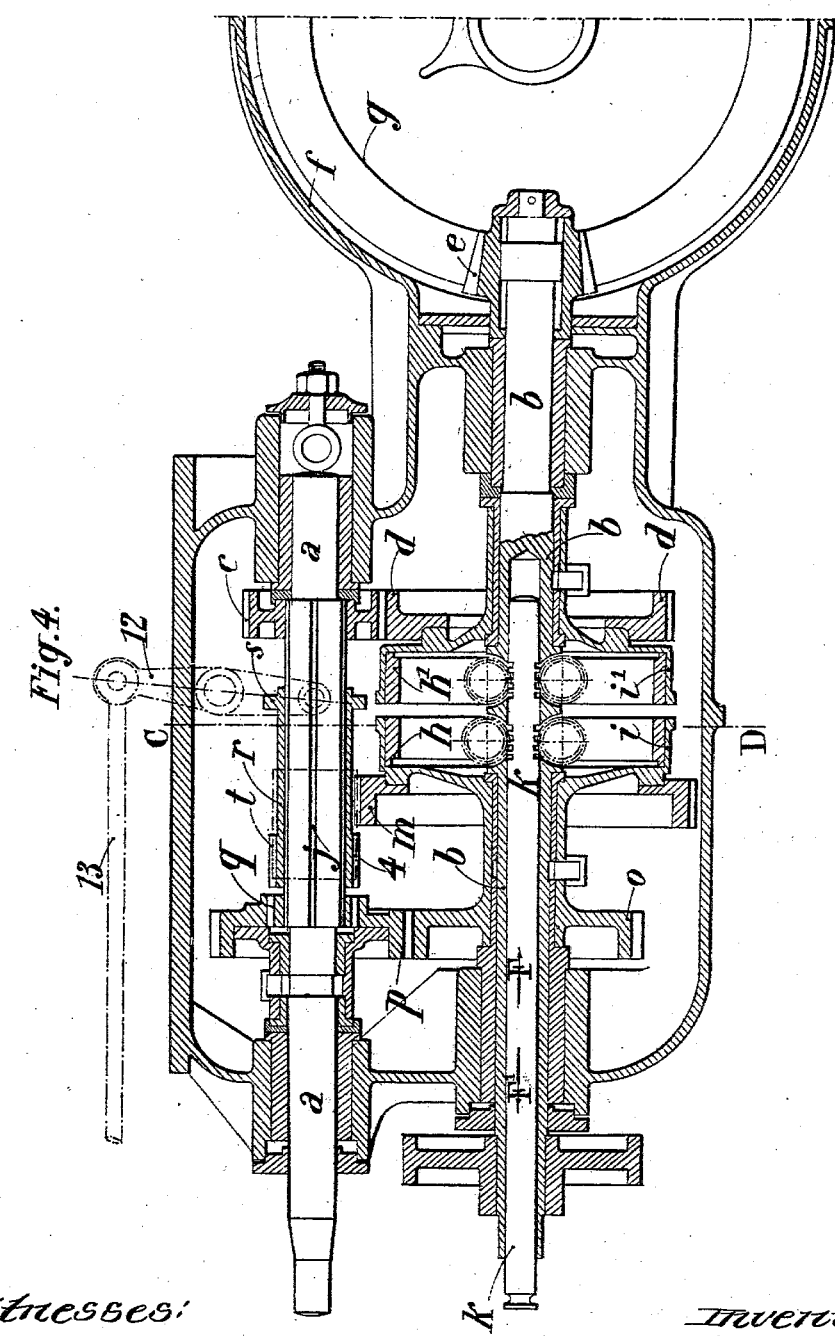

Figure 1 is a longitudinal and axial section of the mechanism arranged for giving two different speeds. Fig. 2 is a transverse section of the same on the line A B of Fig. 1. Fig. 3 is a detail view of the part for reversing the gear not shown in Fig. 1. Fig. 4 is a longitudinal and axial section of a mechanism arranged for three different speeds. Fig. 5 is a cross-section of the same on the line C D of Fig. 4. Fig. 6 is a detailed view of the part for reversing the gear not shown in Fig. 4.

$a$ is the driving-shaft, from which movement is imparted to the transmission-shaft $b$ by means of pinions $c$ and $d$. On the end of the shaft $b$ is keyed a bevel-wheel $e$ in gear with the wheel $g$, forming a part of the ordinary differential gear inclosed in the box $f$, carried by the axle of the driving-wheel of the vehicle. The shaft $b$ is hollow and carries the double friction-clutch described in Letters Patent granted to us, No. 645,312, dated March 13, 1900, the characteristic features of which are two pairs of segments $h$ $h'$, placed inside of two sleeves $i$ $i'$, which revolve freely on the shaft $b$, the said segments being brought into contact with the inner surface of the sleeves $i$ $i'$ by shifting a rack $k$ inside and along the hollow shaft $b$. The sleeve $i$ forms a part of two toothed wheels $m$ $o$, one of which, $m$, is fixed on the periphery, the other, $o$, on the side of the said sleeve $i$, the diameter of the wheel $o$ being less than that of the toothed wheel $d$ aforesaid. The pieces $o$ $m$ $i$ are allowed to revolve freely on the shaft $b$. The wheel $o$ gears with the externally-toothed part $p$ of a wheel which turns freely on the shaft $a$ and which has also an internally-toothed part $q$. On the keys $j$, fixed on the shaft $a$, slides a sleeve $r$, having a collar $s$, a toothed part $t$ forming a gear-wheel and terminates at its left-hand side with teeth $u$ or indentures corresponding to the internal teeth $q$ of the wheel $p$ aforesaid. The teeth or indentures $u$ can be brought into contact with the teeth $q$ by shifting the sleeve $r$ along the shaft $a$ by aid of the operating-lever $v$, Fig. 2, having a forked end in engagement with the collar $s$.

Referring to Figs. 2 and 3, it is seen that in the casing of the mechanism is a yoke 1, pivoted around ears 3, cast with the said casing, and that in the bore of the yoke 1 is fitted freely a toothed wheel 4, which can be put into gear with the toothed wheel $m$ on the sleeve $i$ and toothed wheel $t$ on the sleeve $r$. For this purpose the yoke 1 terminates at its lower part in a slide 5, which engages with the pin 6 of a lever 7, keyed on the shaft 8, Fig. 2, to which angular displacement can be given by means of a suitable arrangement.

The working of the mechanism is the following: Let us suppose the shaft $a$ be in a continuous rotation and the rack $k$ be in its intermediate position. Neither the segments $h$ nor $h'$ are in contact with their respective sleeves $i$ $i'$, which therefore turn freely on the shaft $b$ without imparting a rotation to the same. During this time the vehicle is at rest. The right-hand part $h'$ $i'$ of the clutch being brought into action by shifting the rack $k$ in the direction of the arrow F, the sleeve $i'$ becomes fast on the shaft $b$ and the latter begins to rotate with a speed depending on the ratio of diameters of the gearing-wheels $c$ and $d$. By shifting the rack in the direction of the arrow F' the sleeve $i$ becomes fast on the shaft $b$, so that if the externally and internally toothed wheel $p$ $q$ has previously been keyed on the shaft $a$ by shifting the sleeve $r$ along the said shaft until the teeth $u$ and $q$ are put into contact the said shaft $b$ will revolve with a speed in relation with the ratio of diameter of the toothed wheels $p$ and $o$. We may suppose that is the highest speed. For the purpose of reversing the gear an intermediate pinion 4, Fig. 3, is interposed between the teeth $t$ on the sleeve $r$ and toothed wheel $m$ on the sleeve $i$ during the time this latter is fast on the shaft $b$. It is easily understood that the rotation of the shaft $b$, which results from the gearing $t$ 4 $m$, will be reversed as regards that resulting from the gearing $o$ and $p$ or $c$ and $d$, and as the diameter of the wheel $m$ is larger than that of the wheels $o$ and $d$ the speed of the backward motion of the vehicle will be less than its lowest speed in the forward direction. The interposition of the intermediate pinion 4 is effected, as stated above, by operating the lever 7, and during the whole time this pinion is in gear the wheel $p$ revolves in the reverse direction, that is rendered possible, as this wheel is loose on the shaft $a$. It is obvious that the reversion of the gear only is made possible when the teeth $q$ and $u$ are put out of engagement. Without this condition the whole mechanism would be blocked. In order to prevent the yoke 1 from being lowered during the time the teeth $q$ and $u$ are engaged with each other, the yoke 1 is provided with a lateral projection 9, Fig. 3, which is normally held opposite to the space marked 10 on Fig. 1 and at a short distance from the collar $s$ of the sleeve $r$. When the teeth $u$ and $q$ are engaged, the collar $s$ is placed opposite the projection 9 and prevents the yoke 1 from being lowered, and inversely when the teeth $q$ and $u$ are disengaged the projection 9 is placed opposite to the space 10, and the yoke 1 can be lowered. In other terms, the pinion 4 is allowed to be interposed between the gear-wheels $m$ and $t$. From the foregoing it is seen that the mechanism cannot be set from the high speed to the reverse motion directly, as the pinion 4 can only be placed into its working position when the mechanism runs at lowest speed.

The modification illustrated in Figs. 4, 5, and 6 is intended for providing, instead of two, three different speeds with reverse motion, and include the same parts as the mechanism previously described, the corresponding parts being designated by the same letters of reference. The difference from the foregoing arrangement is that the wheel $m$ in one piece with the sleeve $i$ can be put in direct engagement with the toothed wheel $t$ on the sleeve $r$ and that the said toothed wheel $t$ corresponds to the inner teeth $q$ of the wheel $p$ $q$. We therefore obtain with the right-hand part of the clutch and with the gear-wheels $c$ $d$ a speed which is the intermediate speed. With the left-hand part of the clutch two speeds are obtained—a highest speed when the wheels $o$ and $p$ are in gear and a lowest speed when the wheels $t$ and $m$ are in gear. It is obvious that the stroke of the sleeve $r$, which is shifted by means of lever 12 and rod 13, must be of a convenient extent. For the purpose of interposing the pinion 4 between the toothed wheels $t$ and $m$ an arrangement is used which is somewhat different from that illustrated in Figs. 2 and 3. The width of the wheel 4 should be sufficient to enable it of being applied simultaneously on the gear-wheels $t$ and $m$, which are not placed opposite to one another. The yoke 13', which carries the said wheel 4, rotates with a spindle $x$, supported by the ears $y$ inside the casing of the mechanism. A spring 15, surrounding a stem 16, pivoted on the yoke, continually tends to raise it, and therefore to remove the wheel 4 from the wheels $t$ and $m$. The displacement of the yoke is obtained by means of an eccentric 17, which turns on an axis 18, operated from a suitable device. On the axis $x$ of the yoke 13' is keyed a piece or lug 19, having a flange 20, provided with a notch 21. The width of this notch is that of the collar $s$ of the sleeve $r$, and its position is adjusted so that the said notch is placed opposite to the collar $s$ when the sleeve is in its intermediate position—say when the toothed part $t$ is out of mesh with both gear-wheels $m$ and $q$. Under this condition only it is possible to place the pinion 4 between the gear-wheels $t$ and $m$ for the purpose of reversing the rotation of the latter. On the other hand, this device prevents the pinion 4 from being shifted laterally while it is in its operative position and also prevents it from being put into gear with the wheels $m$ and $t$ for any position of the sleeve $r$ other than that shown on Fig. 4. As described with reference to Figs. 1 to 3, the mechanism illustrated in Figs. 4 to 6 only allows to reverse the movement when the mechanism is working at the lowest speed.

We shall not more particularly describe the devices for operating the several movable parts of the mechanism—such as the rack $k$, sleeve $r$, shaft 8 for operating the yoke 1 or eccentric 17, which acts on the yoke 13'—as these devices do not form a part of our invention and as they may be varied at will, provided they give the desired effect.

Having now particularly described our invention, what we claim as new, and desire to secure by Letters Patent, is—

1. In a variable-speed and gear-reversing mechanism for motor road-vehicles, the combination with a double friction-clutch $h$ $i$ $h'$ $i'$ of the kind described, having a gear-wheel $d$ integral with its part $i'$ and gear-wheels $o$ $m$ integral with the other part $i$, of a drive-shaft, a wheel $c$ fast on the said shaft and gearing with the wheel $d$, and an internally-toothed wheel $p$ loose on the said shaft and gearing with the wheel $o$, a sleeve $r$ movable along the said shaft, and provided with indentures $u$ in suitable relation with the internal teeth $q$ of the wheel $p$, a toothed wheel $t$ and collar $s$ for shifting the said sleeve along said shaft, means for reversing the operation of the gear $m$ and means for engaging the said means with the gear-wheels $t$ and $m$, substantially as described.

2. In a variable-speed and gear-reversing mechanism for motor-vehicles, the combination with a double friction-clutch provided with suitable gear-wheels, of a drive-shaft, a gear-wheel fast thereon, a gear-wheel loosely mounted on the said shaft, a sleeve movable upon the said shaft, a gear-wheel formed integral with the said sleeve, means for reversing the operation of the gear-wheels of the clutch and shaft, means for moving said reversing means into operative position, and means for preventing the engagement of said reversing means with the said gear-wheels of the clutch and shaft.

3. In a variable-speed and gear-reversing mechanism for motor road-vehicles, the combination with a double friction-clutch $h\ i\ h'\ i'$ of the kind referred to, having a gear-wheel $d$ integral with the part $i'$, two gear-wheels $o\ m$ attached to the other part $i$, of a drive-shaft, a wheel $p$ loose on the driving-shaft and in gear with the wheel $o$, a wheel $c$ fast on the said shaft and in gear with wheel $d$, a sleeve $r$ sliding along the driving-shaft, a wheel $t$ integral with the said sleeve and adapted to engage with the gear-wheel $m$, an internally-toothed wheel $q$ adapted to be engaged by the wheel $t$, means for reversing the gear, and means for shifting said reversing means into its operative position, substantially as described.

4. In a variable-speed and gear-reversing mechanism for motor-vehicles, the combination with a double friction-clutch of the character referred to provided with gear-wheels, of a driving-shaft, gear-wheels carried thereby and adapted to mesh with the gear-wheels of the clutch, an intermediate gear-wheel engaging a gear-wheel of the clutch and one of the gear-wheels of the shaft for reversing the operation of the gear, means for shifting the intermediate gear into operative position consisting of a yoke 13, an eccentric 17 bearing on the said yoke and a shaft 18 for operating the eccentric, and means for preventing the lowering of the intermediate gear-wheel 4 consisting of a piece 19 provided with a flange with a notch therein, and a collar $s$ and sleeve $r$, said collar $s$ and sleeve $r$ mounted upon the drive-shaft in suitable relation to the means for preventing the lowering of the intermediate gear 4, substantially as herein shown and described.

In testimony whereof we have hereunto set our hands in presence of two subscribing witnesses.

ALBERT DE DION.
GEORGES BOUTON.

Witnesses:
 EDWARD P. MACLEAN,
 EMILE KLOTZ.